United States Patent [19]

Tanaka

[11] Patent Number: 5,079,435
[45] Date of Patent: Jan. 7, 1992

[54] VEHICLE ANTI-THEFT SYSTEM USING SECOND KEY MEANS

[75] Inventor: Akira Tanaka, Saitama, Japan

[73] Assignee: Honda Giken Kogyo Kabushiki Kaisha, Tokyo, Japan

[21] Appl. No.: 450,898

[22] Filed: Dec. 14, 1989

[30] Foreign Application Priority Data

Dec. 20, 1988 [JP] Japan .................. 63-321741
Dec. 20, 1988 [JP] Japan .................. 63-321742
Dec. 20, 1988 [JP] Japan .................. 63-321744

[51] Int. Cl.$^5$ .................. B60R 25/00; B60R 25/04; H01H 27/06
[52] U.S. Cl. .................. 307/10.2; 307/10.3; 307/10.4; 180/287; 340/825.31
[58] Field of Search .................. 307/10.1, 10.2, 10.3, 307/10.4, 10.6; 340/64, 542, 576, 825.31, 825.32, 825.56, 825.69, 825.34; 180/287

[56] References Cited

U.S. PATENT DOCUMENTS 4,835,407 5/1989 Kataoka et al. .................. 307/10.5
4,965,460 10/1990 Tanaka et al. .................. 307/10.2

Primary Examiner—J. R. Scott
Assistant Examiner—Richard T. Elms
Attorney, Agent, or Firm—Skjerven, Morrill, MacPherson, Franklin & Friel

[57] ABSTRACT

A vehicle anti-theft system, comprising a mechanical key unit, an electronic key unit, and a control unit allowing operation of a motor vehicle only when both the mechanical key unit and the electronic key unit are operataed by a mechanical key and a keyboard, respectively. To permit operation of the motor vehicle even when the second electronic key unit has become unable to operate normally, there is provided a second electronic or mechanical key unit which can be operated manually or by means of the mechanical key. To discourage unauthorized operation of the motor vehicle, the second key unit requires entry of coded data or insertion of a mechanical key into a key switch provided in a poorly accessible part of the vehicle body. In this way, an authorized person can operate the motor vehicle even when the electronic key unit is unable to function normally without increasing the risk of an unauthorized person operating the motor vehicle.

12 Claims, 9 Drawing Sheets

VEHICLE ANTI-THEFT SYSTEM USING SECOND KEY MEANS

TECHNICAL FIELD

The present invention relates to a vehicle anti-theft system and, in particular, to a vehicle anti-theft system which combines a mechanical key and an electronic key.

BACKGROUND OF THE INVENTION

It is proposed in U.S. patent application Ser. No. 236,063 filed Aug. 24, 1988 which names the present inventor as one of the joint inventors to combine a mechanical key and an electronic key in order to discourage theft of a motor vehicle. According to this proposal, matching of both a mechanical key and an electronic key is necessary to operate the vehicle, and an electronic key in the form of an infrared emitter is incorporated in the knob of a mechanical key. Matching of the electronic key takes place when the mechanical key is fitted into a key hole of a key switch and turned to a certain angle. Since the electronic key is much more difficult to duplicate than the mechanical key, an added security is thus obtained.

However, according to this proposal, should the electronic key become inoperable, for instance, due to a fault in the infrared emitter, it becomes impossible to operate the vehicle, and a serious inconvenience would be imposed upon the operator of the vehicle particularly because it would take some time to have the electronic key repaired.

BRIEF SUMMARY OF THE INVENTION

In view of such problems in combining a mechanical key and an electronic key to the end of achieving an improved anti-theft security, a primary object of the present invention is to provide an improved anti-theft system which is provided with an electronic key in additional to a mechanical key for added security, but would not cause any significant inconvenience to the vehicle operator even when the electronic key should become inoperable.

A second object of the present invention is to combine an electronic key and a mechanical key to ensure an improved security even when the electronic key is bypassed in case of a failure thereof.

According to the present invention, these and other objects can be accomplished by providing a vehicle anti-theft system, comprising first mechanical key means including a first key switch which is adapted to be operated by a first mechanical key, first electronic key means including a signal receiver which is adapted to be operated by a first electronic key; and a control unit for allowing a motor vehicle to be operated when both said first mechanical key means and said first electronic key means are operated by said first mechanical key and said first electronic key, respectively, further comprising: second key means which is adapted to be operated by a second key, said control unit allowing said motor vehicle to be operated even when said first electronic key has become unable to function normally only if said mechanical key means is operated by said first mechanical key and said second key means is operated by said second key. Typically, said second key means consists of second electronic key means which is adapted to be manually operated by an operator of said motor vehicle.

Thus, the operator can operate the vehicle even when the electronic key has become unable to function normally. Therefore, the operator is not inconvenienced even when a duplicate electronic key is not readily available to him. In particular, if the second electronic key means comprises a keyboard which is adapted to enter coded data, the risk of an unauthorized person operating the motor vehicle can be reduced.

If said control unit allows operation of said motor vehicle when only said first mechanical key means is operated by said first mechanical key once said second key means is successfully operated by said operator of said vehicle, the operator is not encumbered by the requirement to enter coded data from the keyboard every time he wants to operate the vehicle. In this case, said control unit should require both said first mechanical key means and said first electronic key means to be operated by said first mechanical key and said first electronic key, respectively, once said first electronic key means is operated by said first electronic key.

To reduce the risk of unauthorized operation of the motor vehicle even when the operator has left the vehicle with his key left in the key switch of the vehicle, this system may further comprise means for detecting disembarkation of an operator from said motor vehicle, means for detecting the presence of said first mechanical key in said first key switch, and timer means so that said control unit may allow operation of said motor vehicle only when second key means is successfully operated if said means have detected that said operator has disembarked from said motor vehicle with said first mechanical key left in said first key switch and before a certain time interval set on said timer has run out.

According to a preferred embodiment of the present invention, said second key means consists of second mechanical key means including a second key switch which is adapted to be operated by a second mechanical key. To avoid the inconvenience of the need for carrying two separate keys, said second mechanical key may be identical to said first mechanical key. To discourage any unauthorized attempts to operate the second mechanical key unit without using a proper mechanical key, said second key switch is located in a poorly accessible part of said motor vehicle. For instance, said second key switch may be located in such a manner that an operator of said motor vehicle is unable to directly face a key hole of said second key switch.

BRIEF DESCRIPTION OF THE DRAWINGS

Now the present invention is described in the following in terms of specific embodiments with reference to the appended drawings, in which.

DETAILED DESCRIPTION OF THE PREFERRED EMBODIMENTS

Figure 1:
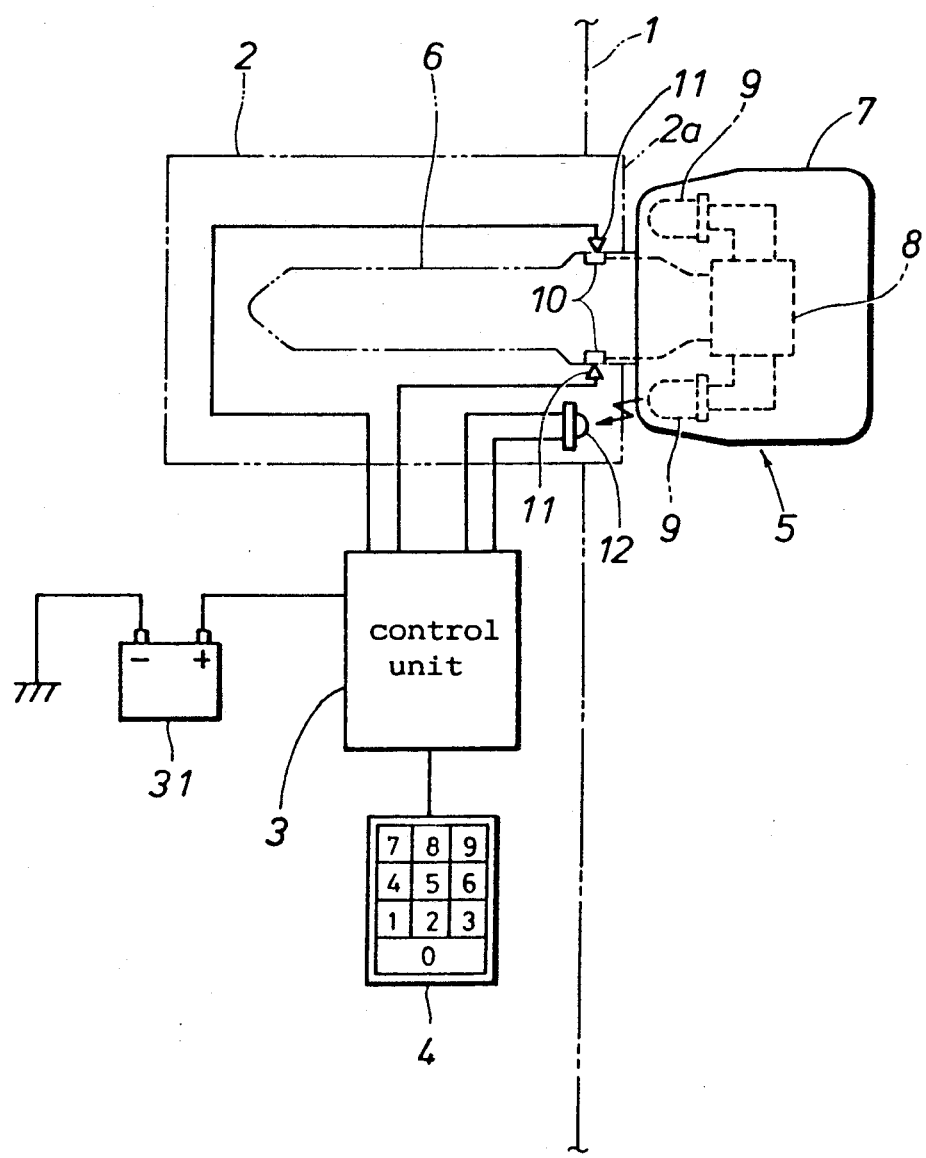
FIG. 1 is a block diagram of a first embodiment of the vehicle anti-theft system according to the present invention.

FIG. 1 shows an overall structure of a first embodiment of the vehicle anti-theft system according to the present invention. This anti-theft system comprises a key switch unit 2 mounted on a steering column of a vehicle body 1 and serving as both a steering lock and an ignition switch, a control unit 3 for controlling the engine start-up and the operation of alarm means as described hereinafter, a keyboard 4 connected to this control unit 3 and provided within the passenger compartment of the vehicle, and a key unit 5 is adapted to be inserted into a key switch 2a of the key switch unit 2 and turned to start the engine.

The key unit 5 consists of a mechanical key 6 and a knob 7 which incorporates an infrared transmitter 8 therein. A pair of light emitting diodes 9 connected to the transmitter 8 are mounted on the knob 7 adjacent to the base end of the mechanical key 6 with their beam axes directed generally towards the tip of the mechanical key 6. The edges of the base end of the mechanical key 6 are provided with a pair of contact pieces 10 for supplying electric current to a rechargeable battery 16 incorporated in the transmitter 8.

The key switch 2a included in the key switch unit 2 consists of a known cylinder lock which is adapted to receive the mechanical key 6. The key switch 2a is provided with a plurality of contact points which are closed as desired according to the angle by which the inserted mechanical key 6 is turned, and a pair of power contact pieces 11 which can come into contact with the contact pieces 10 of the mechanical key 6. The key switch unit 2 is further provided with a phototransistor 12 which can oppose one of the light emitting diodes 9 of the key unit 5 depending on the way the mechanical key 6 is inserted into the key switch 2a, and is electrically connected to the control unit 3.

The mechanical key 6 of the present embodiment is adapted to selectively actuate tumblers (now shown in the drawings) in the key switch 2a to allow the key cylinder to be turned, but other mechanical and electronic key and lock systems may be used in place of this combination of the mechanical key 6 and the key switch 2a.

Figure 2:
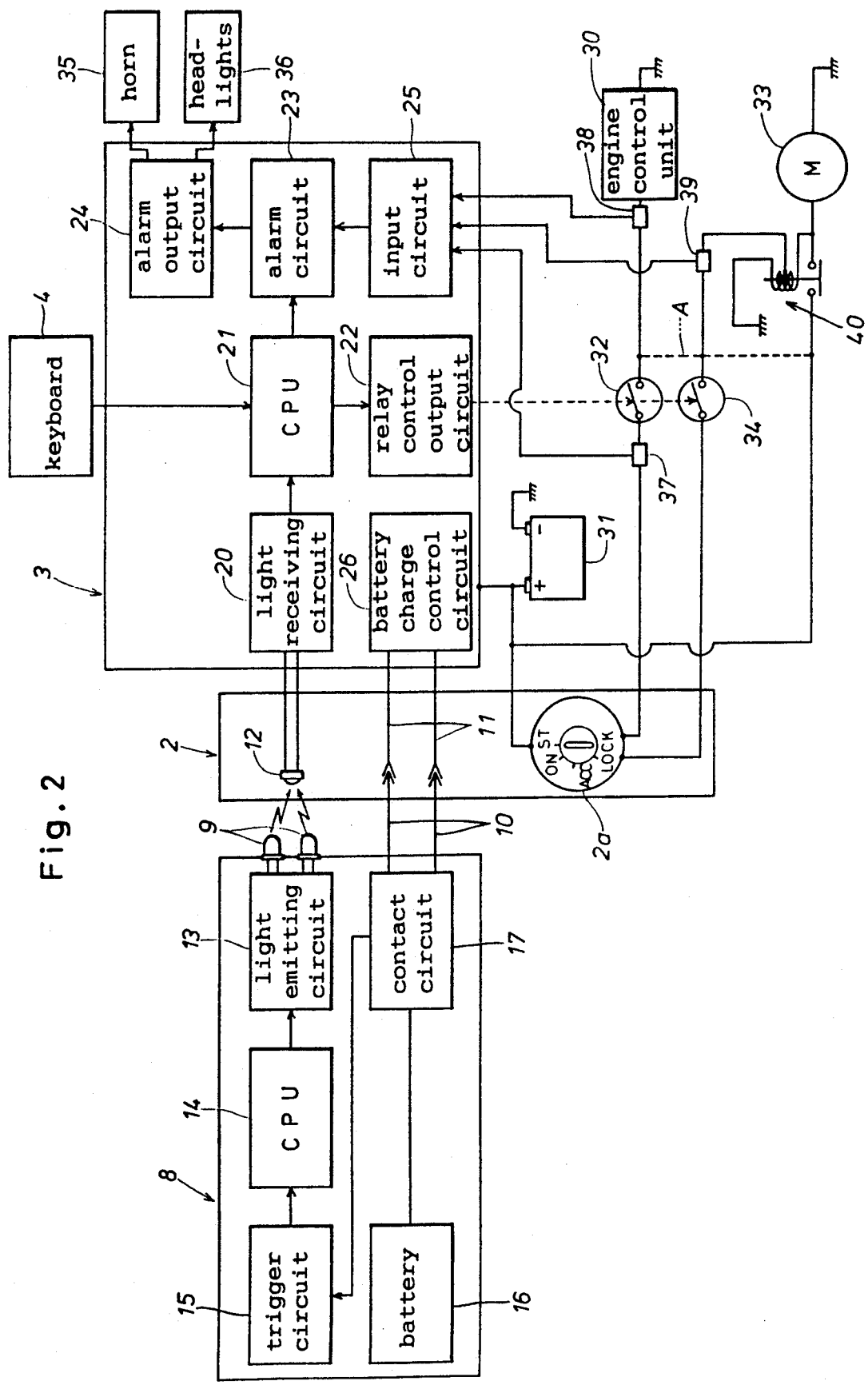
FIG. 2 is a more detailed block diagram of the first embodiment.

Referring to FIG. 2, the light emitting diodes 9 mounted on the knob 7 of the key unit 5 (see FIG. 1) are connected to a light emitting circuit 13 included in the transmitter 8. The light emitting circuit 13 is connected to a CPU 14 which stores an electronic code which is unique to each individual vehicle. To the CPU 14 is connected a trigger circuit 15 which is in turn connected to a contact circuit 17 connected to the contact pieces 10 and the rechargeable battery 16.

The control unit 3 mounted on the vehicle body 1 incorporates a light receiving circuit 20 which is connected to the phototransistor 12, and a CPU 21 which is also connected to the light receiving circuit 20 and stores an electronic code identical to the code stored in the key unit 5.

The CPU 21 is also connected to the keyboard 4 for manually entering the electronic code, as well as a relay control circuit 22 and an alarm circuit 23. The relay control circuit 22 is connected to a main relay 32 interposed between an on-board battery 31 and the ignition system and the fuel injection system of the engine, and a starter relay 34 for activating a starter motor 33 of the engine. The alarm circuit 23 is connected to a horn 35 and a headlight 36 via an alarm signal output circuit 24. The alarm circuit 23 is further connected to a sensor 37 which produces an output signal when the key switch 2a is turned to position "ON", a sensor 38 for detecting application of power to the engine control unit 30, and a sensor for detecting application of power to the starter motor 33, via an input circuit 25.

A battery charge control circuit 26 connected to the on-board battery 31 is connected to the contact pieces 11 of the key switch 2a so that the rechargeable battery 16 in the key unit 5 may be charged via the contact circuit 17 when the mechanical key 6 is inserted into the key switch 2a and the contact pieces 11 are brought into contact with the contact pieces 10.

The key switch 2a has positions "LOCK", "ACC", "ON" and "ST". When position "LOCK" is selected, power is supplied from the on-board battery 31 to the main relay 32. When position "ST" is selected, power is supplied from the on-board battery 31 to both the main relay 32 and the starter relay 34.

Figure 3:
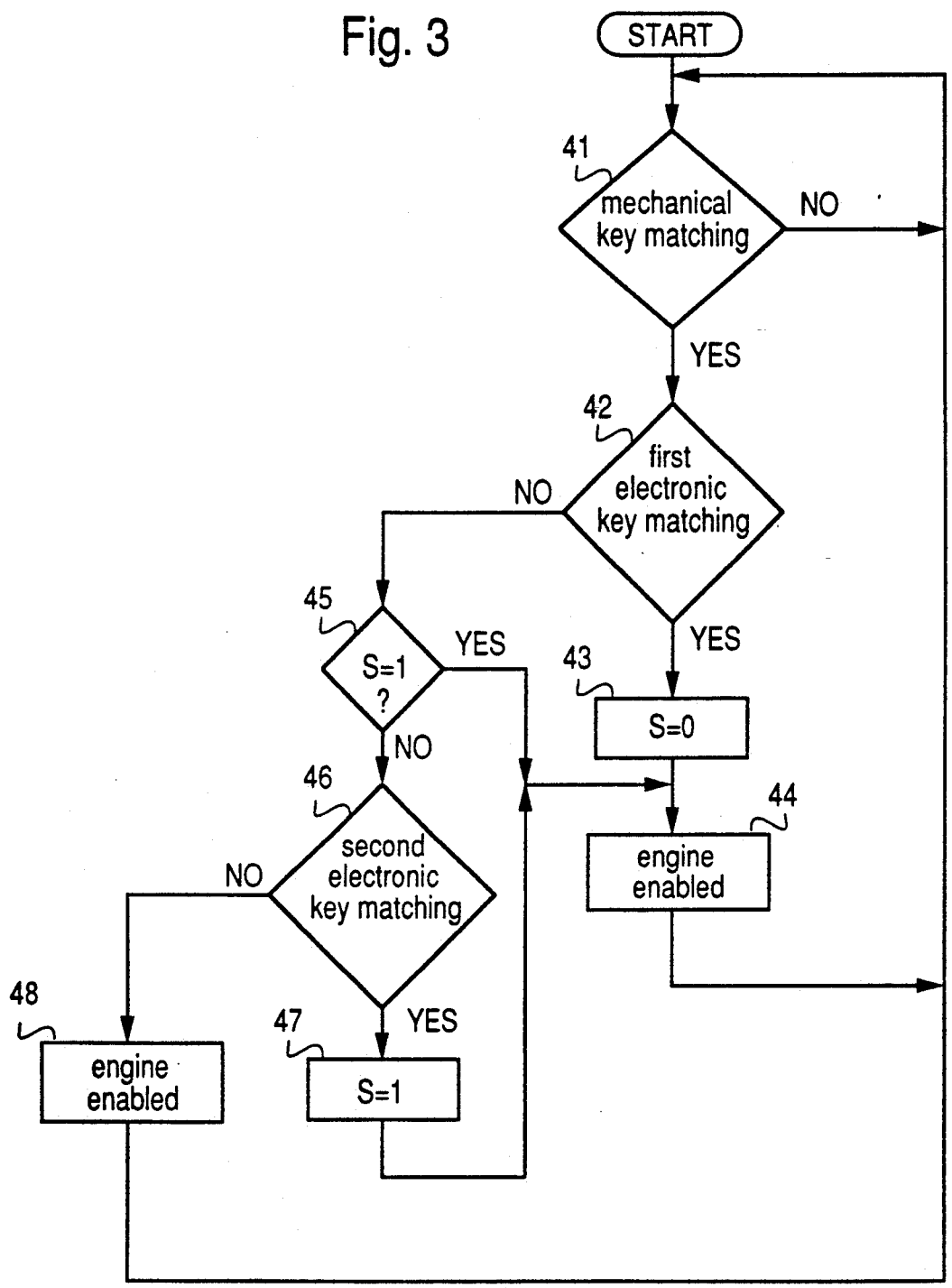
FIG. 3 is a flow chart of the first embodiment.

Now, operation of this anti-theft system is described in the following with reference to FIGS. 1-3.

First of all, the mechanical key 6 is inserted into the key switch 2a (see FIG. 1) to turn the key switch 2a from "LOCK" to "ON" and to establish electric continuity between the contact pieces 10 and 11 (see FIG. 2). When matching of the mechanical key 6 is determined in step 41 (see FIG. 3), a contact acknowledgment signal is supplied from the contact circuit 17 to the trigger circuit 15. Then, under command from the trigger circuit 15, the CPU 14 supplies a unique electric code to the light emitting circuit 13 which activates the light emitting diodes 9 into emitting a coded infrared beam to the phototransistor 12. Upon reception of this coded infrared beam, the phototransistor 12 transmits the electronic code to the CPU 21 via the light receiving circuit 20. In step 42, the CPU 21 determines the matching of the electronic key. If there is a matching, zero is placed in a flag S in step 43. This flag S allows distinction between the case where the matching took place through transmission of an infrared beam from the light emitting diodes 9 to the phototransistor 12 and the case where the matching took place through manual entry of the electronic code from the keyboard 4.

In step 44, the CPU 21 turns on the main relay 32 and the starter relay 34 via the relay control output circuit 22 and supplies power from the on-board battery 31 to the engine control unit 30 and the starter motor 33. At the same time, an alarm disable signal is supplied from the CPU 21 to the alarm circuit 23. Thus, when the key switch 2a is turned to "ST", the engine is actually started. Thereafter, the engine can function in normal fashion. If any of the sensors 37 through 39 are activated when no alarm disable signal is supplied to the alarm circuit 23, an alarm is issued from the alarm circuit 23.

If matching of the electronic code did not occur in step 42, for instance due to a fault in the key unit 5 or mismatch of the electronic code, it is determined in step 45 if the flag S contains "1" or not. If the flag S does not contain value "1", the system awaits the operator to enter the correct electronic code from the keyboard 4 in step 46. If it is found in step 46 that the electronic code manually entered from the keyboard 4 matches up with the correct electronic code of the vehicle, "1" is placed in the flag S in step 47 and the program flow advances to step 44 where it is allowed to start the engine. If matching of the electronic code does not take place manually from the keyboard 4 for more than 30 seconds after the key switch 2a is turned to "ON" and an electronic continuity is established between the contact pieces 10 and 11, the CPU 21 disables the entry of any electronic code from the keyboard 4. This is to reduce the possibility of unauthorized operation of the keyboard 4. Based upon the same consideration, entry of an electronic code from the keyboard 4 may be rendered impossible for a certain time interval when there were three unsuccessful attempts to enter the electronic code from the keyboard 4.

When matching of the electronic code did not take place in step 46, the engine control unit 30 and the starter motor 33 are disabled in step 48 and, at the same time, the alarm circuit 23 is brought to a ready condition. Thus, The relay control output circuit 22 does not produce the signals to actuate the relays 32 and 33.

If power is supplied to the engine control unit 30 and the starter motor 33 by jumping wire and bypassing the relays 32 and 33 as shown by the dotted line A in FIG. 2 in this situation, an activation signal is supplied from the sensor 38 and/or the sensor 39 to the alarm circuit 23 via the sensor input circuit 25, and an alarm is actually issued.

If it is found in step 45 that the flag S contains "1", or the engine was started in the previous occasion by entry of the electronic code from the keyboard 4 instead of by infrared transmission from the light emitting diodes 9 to the phototransistor 12, the matching of the electronic code from the keyboard 4 is omitted and the program flow advances directly from step 45 to step 44. In other words, once the matching of the electronic code is made manually from the keyboard 4, from then on, the engine can be started by the matching of the electronic key 7 alone.

On the other hand, once the matching of the electronic code is made through signal transmission from the light emitting diodes 9 to the phototransistor 12, the matching of the mechanical key alone will not be sufficient to allow the operation of the engine, or matching of electronic code by transmission of a signal from the light emitting diodes 9 to the phototransistor 12 or manual entry of the electronic code from the keyboard 4 becomes necessary to operate the motor vehicle.

If desired, selection of the electronic code which is to be entered from the keyboard 4 may be made by the owner of the vehicle. It is also possible to prepare two or more codes which may be entered from the keyboard 4 to enable the vehicle so that the manual entry of the code from the keyboard 4 may be necessitated each time or only once depending on which of the codes has been entered from the keyboard 4.

The key unit 5 may be provided with a push-button switch, for example at its knob, to cause transmission of an electronic code instead of doing the same upon detection of the establishment of electronic contact between the contact pieces 10 and 11. The manual entry of the electronic code may be achieved by any means other than a keyboard, for instance by using a speech recognition which allows entry of an electronic code by speech.

Figure 4:
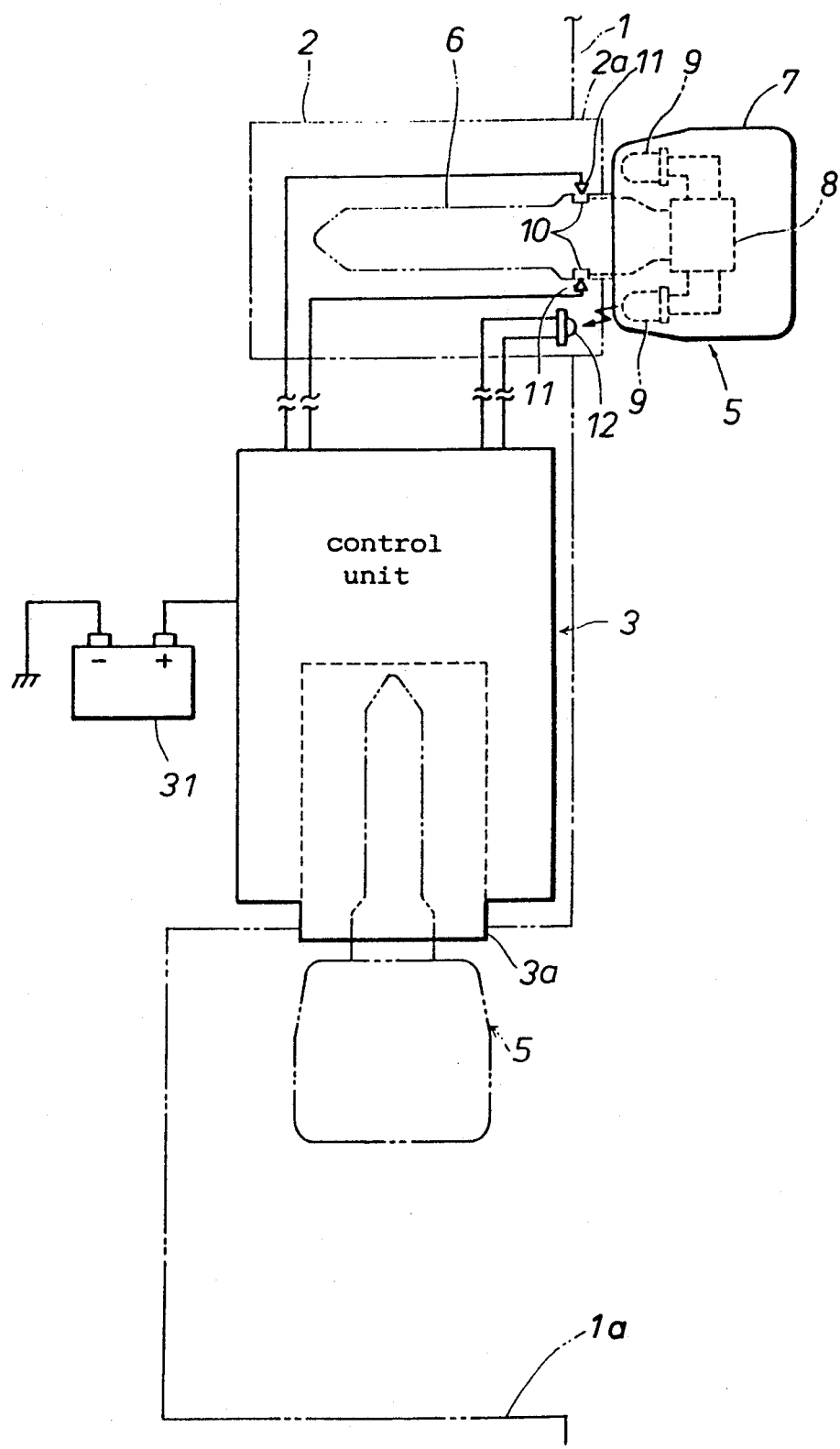
FIG. 4 is a block diagram of a second embodiment of the vehicle anti-theft system according to the present invention.
Figure 5:
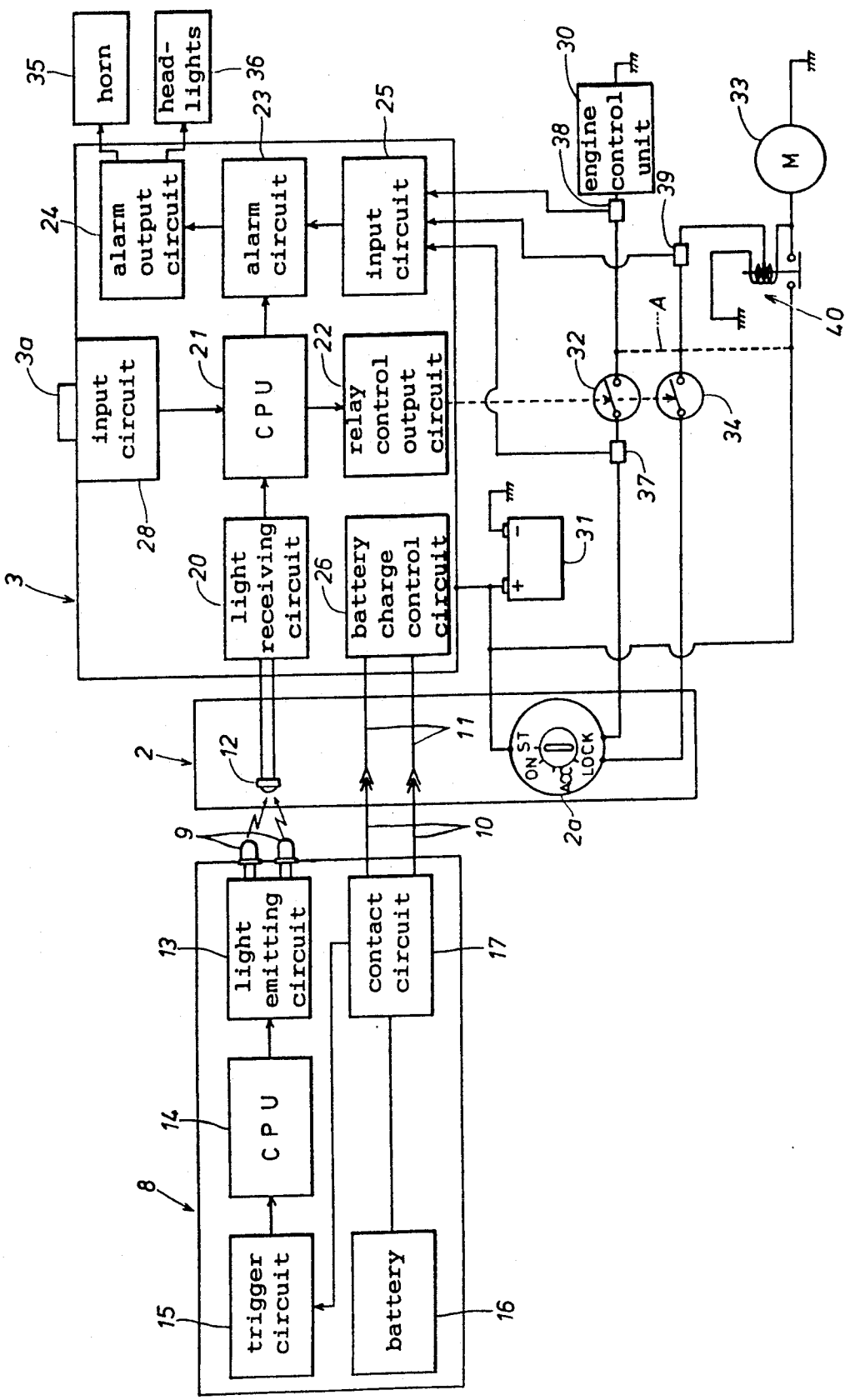
FIG. 5 is a more detailed block diagram of the second embodiment.
Figure 6:
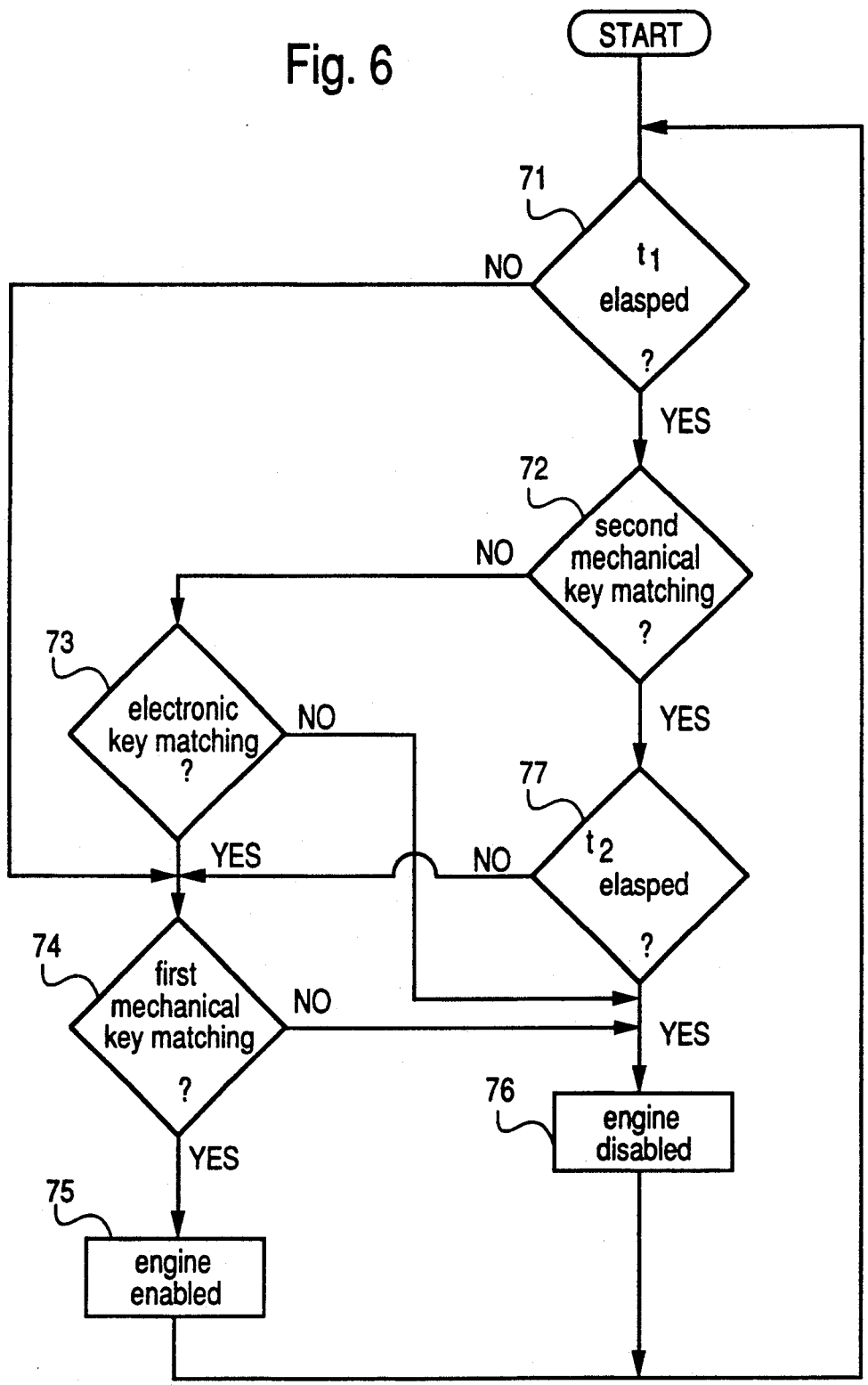
FIG. 6 is a flow chart of the second embodiment.

FIGS. 4 through 6 show a second embodiment of the present invention. According to this embodiment, as shown in FIGS. 4 and 5, a second key switch 3a is provided in the control unit 3 instead of a keyboard 4. This key switch 3a consists of a cylinder lock similar to the key switch 2a, and is provided with contact points which are adapted to be actuated when the mechanical key 6 is inserted into the key switch 3a and turned therein. In particular, the key hole of the key switch 3a is provided in a part of the vehicle body which the operator cannot face due to presence of a wall member 1a or which is not very accessible to the operator of the vehicle. This location of the key switch 3a is selected so as to discourage any attempts to pick the key cylinder 3a or any unauthorized attempts to turn the key cylinder 3a without using a legitimate mechanical key. The control unit 3 is fixedly secured to the vehicle body 1 in such a fashion that it cannot be easily removed or accessed by any unauthorized person.

The mode of operation of this embodiment is now described in the following with reference to the flow chart of FIG. 6.

It is determined in step 71 whether a certain time interval $t_1$, for instance three minutes, has passed after the engine was stopped previously. If this time interval $t_1$ has indeed passed after the engine was stopped last time, it is determined whether the mechanical key 6 is inserted into the key switch 3a, and a bypass signal from the closure of the mechanical contacts of the key switch 3a has been supplied to the CPU 21 via the input circuit 28 or not in step 72. If no bypass signal has been supplied to the CPU 21, an electronic code matching by way of an infrared beam is carried out in step 73. If this code matching is successfully completed, it is then determined if matching of the mechanical key 6 in the key switch 2a has been successful or not in step 74. If both the electronic code matching and the mechanical key matching have been successful, the program flow advances to step 75 where the main relay 32 and the starter relay 34 are both closed by way of the relay control output circuit 22, and power is supplied from the on-board battery 31 to the engine control unit 30 and the starter motor 33. At the same time, an alarm disable signal is supplied to the alarm circuit 23.

On the other hand, if either the electronic code matching in step 73 or the mechanical key matching in step 74 failed, the program flow advances to step 76 where the engine control unit 30 and the starter motor 33 are both disabled, and the alarm circuit 23 is set ready for issuing an alarm. If power is supplied to the engine control unit 30 and the starter motor 33 by jumping wire and bypassing the relays 32 and 33 in this situation, an activation signal is supplied from the sensor 38 or 39 to the alarm circuit 23 via the sensor input circuit 25, and an alarm is actually issued.

If a prescribed time interval $t_1$ has not passed after the engine was stopped last time in step 71, the program flow advances directly to step 74, and starting of the engine is made possible by the matching of the mechanical key alone. This is to eliminate the need for actuating the key switch 3a even when the engine is stopped for only a short time due to stalling or other reasons and no possibility of any unauthorized attempts to operate the vehicle exists.

If a bypass signal has already been supplied from the input circuit 28 to the CPU 21 in step 72 as a result of actuation of the key switch 3a by the mechanical key 6, the program flow advances to step 77, and it is determined whether a certain time interval $t_2$, for instance two minutes, has passed after the input of the bypass signal or not. If it is found that this time interval has already passed in step 77, the input of the cancel signal is nullified, and the matching of the mechanical key is invalidated. Thus, starting of the engine is made impossible in step 76 and the system flow returns to step 71. This is intended as a measure to foil any unauthorized attempts to actuate the key switch 3a.

Figure 7:
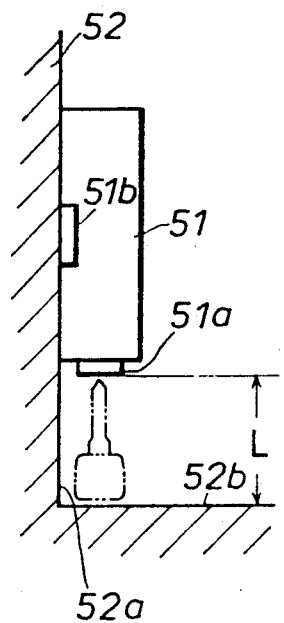
FIGS. 7 through 10 are schematic views showing various possible arrangements of the second mechanical key unit.
Figure 8:
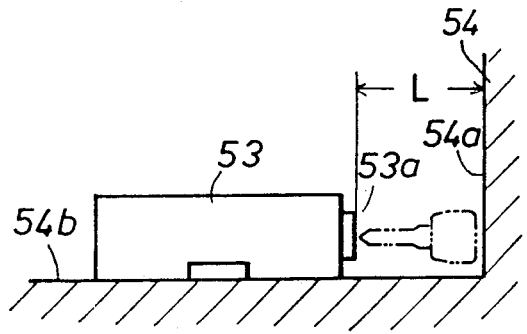

FIGS. 7 through 8 show various other possible arrangements of the second key switch.

In the embodiment illustrated in FIG. 7, the control unit 51 is securely attached to a side wall 52a of a vehicle body 52 by means of a pair of tabs 51b with the key hole of a key switch 51a (corresponding to the key switch 3a of FIG. 4) incorporated in the control unit 51 facing downwards. The distance L between the key hole of the key switch 51a and a bottom wall surface 52b of the vehicle body 52 is selected in such a manner that the distance L is sufficient for inserting the mechanical key into the key hole but insufficient for any person to actually face or see the key hole.

In the embodiment illustrated in FIG. 8, the control unit 53 is mounted on a bottom wall surface 54b of a vehicle body 54 with the key hole of a key switch 53a (corresponding to the key switch 3a of FIG. 4) facing a side wall 54a of the vehicle body 54. Again, the distance L between the key hole of the key switch 53a and the side wall surface 54a of the vehicle body 54 is selected in such a manner that the distance L is sufficient for inserting the mechanical key into the key hole but insufficient for any person to actually face or see the key hole.

Figure 9:
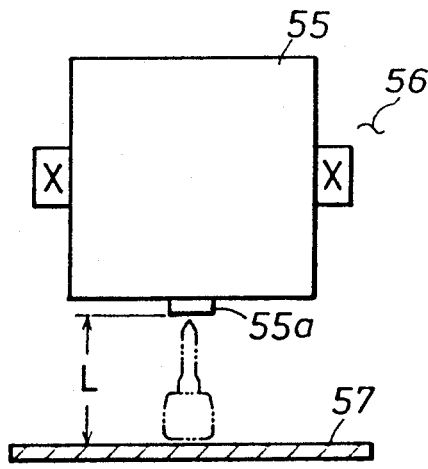

In the embodiment illustrated in FIG. 9, the control unit 55 is mounted on a floor surface or a side wall surface and the key hole of a key switch 55a (corresponding to the key switch 3a of FIG. 4) is provided on one side surface of the control unit 55. A wall member 57 is provided on the floor surface or the side wall surface defining a distance L between the wall member 57 and the key hole. Again, the distance L between the key hole of the key switch 55a and the wall member 57 is selected in such a manner that the distance L is sufficient for inserting the mechanical key into the key hole but insufficient for any person to actually face or see the key hole.

Figure 10:
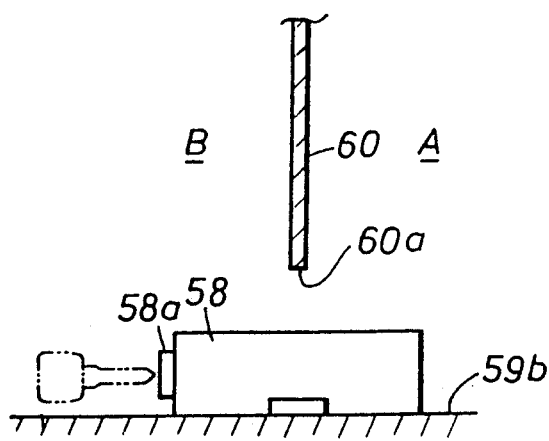

In the embodiment illustrated in FIG. 10, the control unit 58 is mounted on a bottom wall surface 59b of a vehicle body, and an edge of a partition wall 60 extend close to the control unit 58, separating the area surrounding the control unit 58 into a visible region A and an invisible region B. Because the operator situated in the visible region A is unable to see the key hole of a key switch 58a (corresponding to the key switch 3a of FIG. 4) which is situated in the invisible region B, he has to feel where the key hole is by his hand, or, in other words, the key hole is situated in a location to which the operator can barely get access.

The poor accessibility to the key hole in these embodiments is intended to discourage any authorized attempts to turn the key switch without using a legitimate key.

Figure 11:
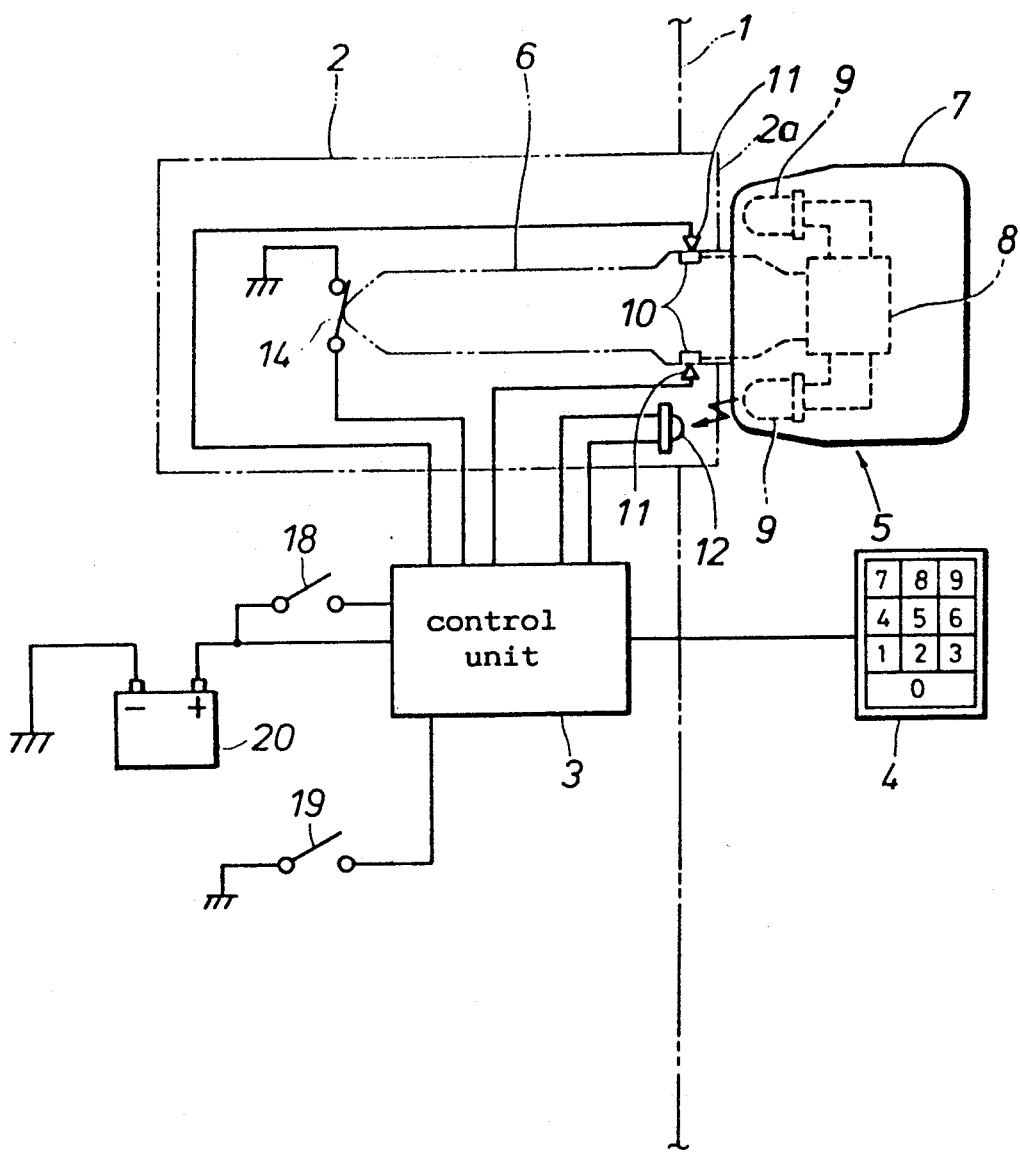
FIG. 11 is a block diagram of a third embodiment of the vehicle anti-theft system according to the present invention.

FIG. 11 shows a third embodiment of the present invention. This vehicle anti-theft system is similar to the previous embodiments as far as its hardware structure is concerned except for that an ignition switch 18 and a door switch 19 are connected to the control unit 3.

Figure 12:
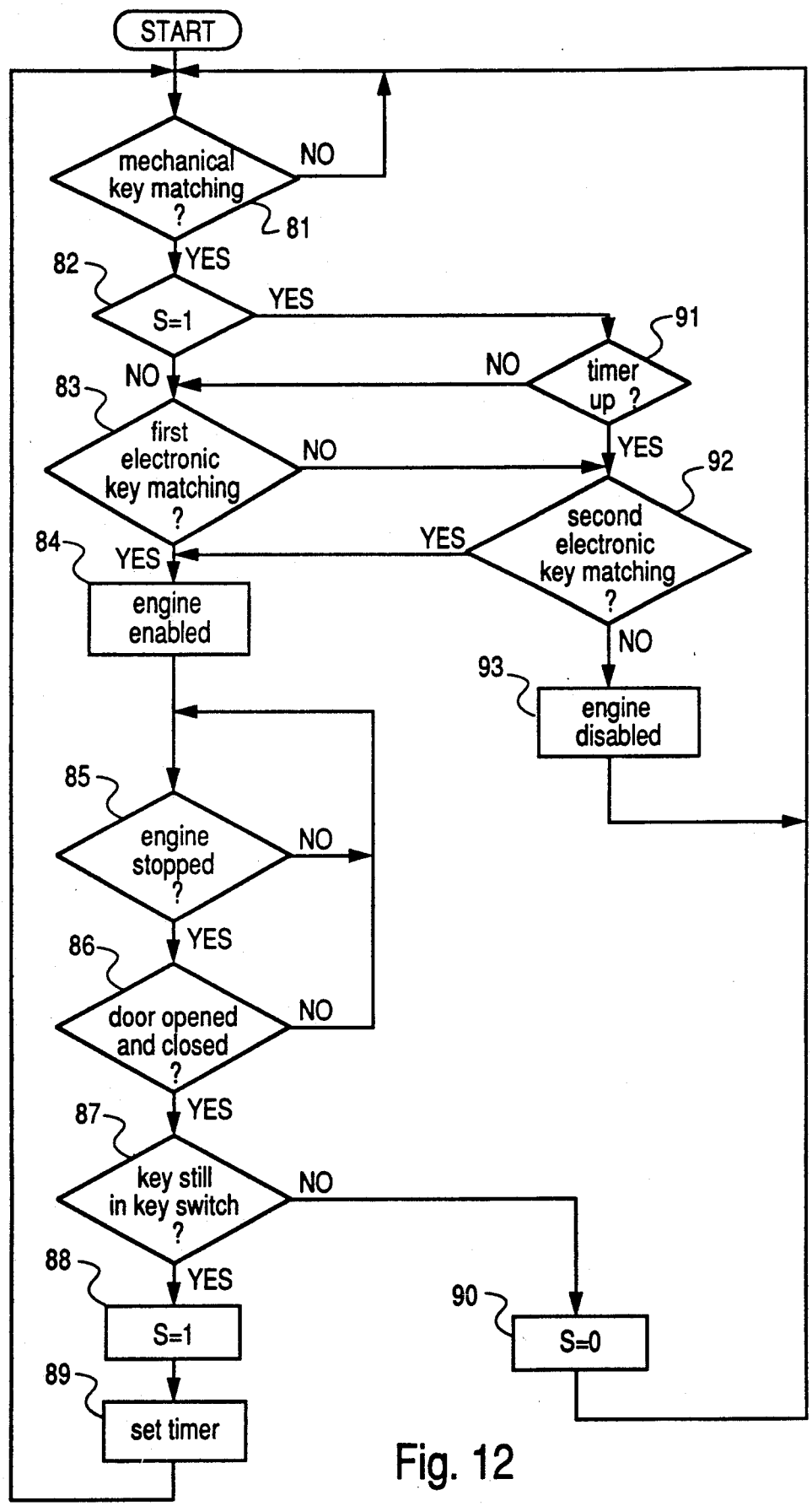
FIG. 12 is a flow chart of the third embodiment.

The mode of operation of this embodiment is described in the following with reference to the flow chart of FIG. 12.

When the mechanical key 6 is inserted into the key switch 2a and is turned to a prescribed angle, matching of the mechanical key is determined by contact between the contact pieces 10 and 11 (step 81). When matching of the mechanical key is detected in step 81, the content of a flag S is determined in step 82. If the flag S contained "1", matching of the electronic code is carried out in step 83 by way of an infrared beam emitted from the light emitting diodes 9 to the phototransistor 12. It may be arranged so that this transmission of an infrared beam may be triggered by contact between the contact pieces 10 and 11. If matching of the electronic code is completed successfully, the engine is started in step 84. Thus, the motor vehicle is enabled to operate normally until the engine is stopped next time.

When it is detected by a signal from the ignition switch 18 that the engine has been stopped in step 85, it is determined by a signal from the door switch 19 whether the door of the driver's seat has been opened and closed or not in step 86. If the engine has not been stopped or if the door has not been opened and closed, the program flow returns to step 85. If the engine has been stopped and the door has been opened and closed, it is then determined in step 87 whether the mechanical key is still left in the key switch 2a or not. If the key is still in the key switch 2a, "1" is placed in the flag S, and the program flow returns to step 81 after setting a timer, for instance a 15-second timer, in step 89. If the key is not in the key switch 2a in step 87, "0" is placed into the flag S and the program returns to step 81.

In step 82, it is determined whether the flag S carries "1" or not, or, in other words, whether the door of the driver's seat has been opened and closed after stopping the engine or not. If the flag S carries "1" the program flow advances to step 91 where the time interval, 15 seconds in this case, set on the timer in step 89 has run out or not. If the time interval has not yet run out, or if it is not the case where an operator of the vehicle has left the key in the key switch 2a after stopping the engine and leaving the car unattended by opening and closing the door, the program advances to step 83 to permit the engine to be started by normal procedure. If it was found in step 91 that the timer interval set on the timer has run out, the program flow then advances to step 92 and, in this case, starting of the engine requires entry of a correct code from the keyboard 4 (step 92). If the correct code is entered, the engine can be started in step 84. On the other hand, an incorrect code is entered from the keyboard 4 or entry of a correct code did not take place for more than a certain timer interval, starting of the engine is made impossible in step 93.

In this particular embodiment, if there were three unsuccessful attempts to enter the correct code from the keyboard 4, the program flow advances from step 92 to step 93, and starting of the engine is made impossible.

Thus, according to this embodiment, even when the vehicle operator has left his vehicle unattended and leaving his engine key (which may be equipped with an electronic transmitter serving as an electronic key or may not be equipped with any such electronic key) left in the key switch, theft of the vehicle can be effectively prevented.

The present invention is not limited to the above described embodiment. For instance, the sensors for detecting departure of the operator of the vehicle unattended with his key left in the key switch 2a can include a door lock switch for detecting the locking action of the door in addition to the door switch for detecting the opening and closing of the door. Also, a proximity sensor may be employed to detect the departure of the operator from the motor vehicle. It is also possible to arrange so that the code which is to be entered from the keyboard may be selected by the operator by entering a suitable command from the keyboard 4.

What I claim is:

1. A vehicle anti-theft system, comprising first mechanical key means including a first key switch which is adapted to be operated by a first mechanical key, first electronic key means including a signal receiver which is adapted to be operated by a first electronic key; and a control unit for allowing a motor vehicle to be operated when both said first mechanical key means and said first electronic key means are operated by said first mechanical key and said first electronic key, respectively, further comprising:

second key means which is adapted to be operated by a second key, said control unit allowing said motor vehicle to be operated even when said first electronic key has become unable to function normally only if said first mechanical key means is operated by said first mechanical key and said second key means is operated by said second key.

2. A vehicle anti-theft system according to claim 1, wherein said second key means consists of second electronic key means which is adapted to be manually operated by an operator of said motor vehicle.

3. A vehicle anti-theft system according to claim 2, wherein said second electronic key means consists of a keyboard.

4. A vehicle anti-theft system according to claim 1, wherein said first mechanical key is integrally provided with said first electronic key, said first electronic key comprising a transmitter which is capable of transmitting a signal to said signal receiver of said first electronic key means.

5. A vehicle anti-theft system according to claim 1, wherein said control unit allows operation of said motor vehicle when only said first mechanical key means is operated by said first mechanical key, once said second means is successfully operated by said second key.

6. A vehicle anti-theft system according to claim 5, wherein said control unit requires both said first mechanical key means and said first electronic key means to be operated by said first mechanical key and said first electronic key, respectively, even after said second key means is successfully operated by said second key, once said first electronic key means is operated by said first electronic key.

7. A vehicle anti-theft system according to claim 1, further comprising means for detecting disembarkation of an operator from said motor vehicle, means for detecting the presence of said first mechanical key in said first key switch, and a timer means, said control unit allowing operation of said motor vehicle only when said second key means is successfully operated if said detection means has detected that said operator has disembarked from said motor vehicle with said first mechanical key left in said first key switch, and a certain time interval set on said timer has run out.

8. A vehicle anti-theft system according to claim 1, wherein said second key means consists of second mechanical key means including a second key switch which is adapted to be operated by a second mechanical key.

9. A vehicle anti-theft system according to claim 8, wherein said second mechanical key is identical to said first mechanical key.

10. A vehicle anti-theft system according to claim 7, wherein said means for detecting disembarkation of a vehicle operator comprises an ignition switch, a door switch and a controller which produces an output signal when said ignition switch is turned off and said door switch is actuated.

11. A vehicle anti-theft system according to claim 8, wherein said second key switch is located in a poorly accessible part of said motor vehicle.

12. A vehicle anti-theft system according to claim 11, wherein said second key switch is located in such a manner that an operator of said motor vehicle is unable to directly face a keyhole of said second key switch.

* * * * *